(12) United States Patent
Yoshino

(10) Patent No.: US 7,544,392 B2
(45) Date of Patent: Jun. 9, 2009

(54) METHOD FOR PRODUCING MULTILAYER OPTICAL DEVICE

(75) Inventor: Kunihiko Yoshino, Yokohama (JP)

(73) Assignee: Nikon Corporation, Tokyo (JP)

( * ) Notice: Subject to any disclaimer, the term of this patent is extended or adjusted under 35 U.S.C. 154(b) by 170 days.

(21) Appl. No.: 11/606,517

(22) Filed: Nov. 30, 2006

(65) Prior Publication Data

US 2007/0196586 A1    Aug. 23, 2007

Related U.S. Application Data

(60) Division of application No. 11/299,481, filed on Dec. 12, 2005, now abandoned, which is a continuation of application No. PCT/JP2004/008835, filed on Jun. 14, 2004.

(30) Foreign Application Priority Data

Jun. 26, 2003   (JP) .............................. 2003-182450

(51) Int. Cl.
   *B05D 5/06*   (2006.01)
   *B05D 1/36*   (2006.01)

(52) U.S. Cl. .................. 427/419.1; 427/162; 427/419.3

(58) Field of Classification Search ........................ None
   See application file for complete search history.

(56) References Cited

U.S. PATENT DOCUMENTS

| | | | |
|---|---|---|---|
| 3,551,017 A | 12/1970 | Iwasaki et al. | |
| 4,373,775 A | 2/1983 | Gasparian | |
| 4,883,561 A * | 11/1989 | Gmitter et al. | ................. 438/27 |
| 4,937,134 A | 6/1990 | Schrenk et al. | |
| 4,940,636 A | 7/1990 | Brock et al. | |
| 5,044,736 A | 9/1991 | Jaskie et al. | |
| 5,241,417 A | 8/1993 | Sekiguchi | |
| 6,143,117 A * | 11/2000 | Kelly et al. | ................. 156/233 |
| 6,611,378 B1 * | 8/2003 | Wang et al. | ................. 359/588 |

FOREIGN PATENT DOCUMENTS

| | | |
|---|---|---|
| JP | 3-196001 A | 8/1991 |
| JP | 9-277396 A | 10/1997 |
| JP | 2000-47028 A | 2/2000 |

OTHER PUBLICATIONS

Translation of JP-03-196001.*

* cited by examiner

*Primary Examiner*—Ling Xu
(74) *Attorney, Agent, or Firm*—Frishauf, Holtz, Goodman & Chick, P.C.

(57) ABSTRACT

A film of aluminum 2 is formed on a glass substrate (BK7) 1 by vacuum evaporation, and a multilayer optical thin film 3 is formed by an ion sputtering method on this aluminum film 2. Afterwards, such a member is cut into small pieces by means of dicing, and the aluminum 2 is then etched by a sodium hydroxide solution, so that the glass substrate 1 and the multilayer optical thin film 3 are separated. When the aluminum thickness exceeds 90 nm, clouding occurs in the multilayer optical thin film 3, and when the aluminum thickness is less than 10 nm, the separation of the glass substrate and multilayer optical thin film cannot be performed cleanly. Accordingly, the aluminum thickness is set in a range of 10 to 90 nm.

3 Claims, 1 Drawing Sheet

METHOD FOR PRODUCING MULTILAYER OPTICAL DEVICE

CROSS-REFERENCE TO RELATED APPLICATIONS

This application is a divisional application of application Ser. No. 11/299,481 filed Dec. 12, 2005 now abandoned, which is a continuation application of PCT International Application No. PCT/JP2004/008835 filed Jun. 14, 2004, which is hereby incorporated by reference.

BACKGROUND OF THE INVENTION

1. Technical Field

The present invention relates to a method for manufacturing a multilayer film optical element that is formed by laminating thin films consisting of substances having different refractive indices.

2. Background Art

An optical element that is provided with specified optical characteristics such as filtering by laminating thin films consisting of substances with different refractive indices and utilizing interference of light reflected at the boundaries of the thin films is known as a multilayer film optical element, and is used in an interference filter or the like.

Such a multilayer film optical element has a structure in which thin films of nonmetal optical substances with different refractive indices are successively superimposed on a substrate consisting of glass or the like, and is ordinarily formed by successive film formation of these nonmetal optical substances on a substrate consisting of glass or the like by means of vacuum evaporation.

In such an optical element, not only does the substrate consisting of glass or the like play no role in determining the optical characteristics, but it also absorbs light, so that it is necessary that the substrate be as thin as possible. Accordingly, such substrates have conventionally been polished following the multilayer film formation to keep the thickness down to approximately several tens of microns.

However, it is extremely difficult to polish a substrate consisting of glass or the like to a thickness of approximately several tens of microns, and there is a problem in that the yield is lowered due to damage to the glass during polishing.

A multilayer film optical thin film that does not have a substrate as described, for example, in Japanese Patent Application Kokai No. H3-196001, has been publicly known as an optical element that solves such a problem.

Such a multilayer film optical thin film is manufactured as follows: For example, aluminum is deposited on a glass substrate, and silicon oxide thin films and titanium oxide thin films are alternately formed on top of this by means of ion sputtering. If the aluminum is dissolved by an aluminum etching liquid at the completion of the film formation, the glass substrate and the multilayer optical thin film are separated, so that a multilayer optical thin film having no glass substrate can be obtained.

However, as a result of the experiments conducted by the inventor, it was found that there are major problems in the method for manufacturing a multilayer optical thin film of the type described in Japanese Patent Application Kokai No. H3-196001. That is to say, in cases where a multilayer optical thin film is formed by ion sputtering or the like, projections and indentations are produced at the interface between the aluminum and multilayer optical thin film; as a result, the multilayer optical thin film is clouded, leading to a significant drop in the transmissivity of light, so that such an optical thin film cannot withstand practical use. Aside from this, it was also found that aluminum does not adequately play a role as a carrier, so that the problem of incomplete separation of the glass substrate and multilayer optical thin film was encountered.

SUMMARY OF THE INVENTION

The present invention was devised in light of such circumstances; it is an object of the present invention to provide a method for manufacturing a multilayer film optical element which makes it possible to prevent the clouding in the multilayer optical thin film and to cleanly separate the glass substrate and multilayer optical thin film.

The first invention that is used to achieve the object described above is a method for manufacturing a multilayer film optical element including steps of forming a thin film of a soluble on a substrate, forming a multilayer optical thin film on top of this soluble, and subsequently dissolving the thin film of the soluble so that the substrate and the multilayer optical thin film are separated, wherein the soluble is aluminum, and the thickness of this soluble is set at 10 to 90 nm.

As a result of investigation of the causes of clouding of a multilayer optical thin film as described above, the present inventor ascertained that recrystallization of aluminum constituting the soluble occurs due to the heat generated when the multilayer optical thin film is formed by ion sputtering; as a result, projections and indentations are created at the interface between the aluminum and multilayer optical thin film, which results in the generation of clouding. When the inventor continued further investigation, it was discovered that the state of this unevenness varies according to the thickness of the aluminum layer, and that if the thickness of the aluminum layer is 90 nm or less, problematic clouding does not occur.

The present inventor also found that the reason that the separation of the substrate and optical thin film cannot be accomplished cleanly is that if the thickness of the aluminum layer is excessively small, portions where no aluminum layer is formed are generated, and that there are cases in which the substrate and multilayer thin film are directly bonded in these portions. After much experimentation, it was discovered that as long as the thickness of the aluminum layer is 10 nm or more, such a problem does not occur.

Accordingly, in the present invention, the thickness of the aluminum layer serving as a soluble is limited to a range of 10 to 90 nm. Here, the thickness refers to an average value.

The second invention that is used to achieve the object described above is the first invention, wherein the step of forming the multilayer optical thin film is an ion sputtering step.

In cases where the multilayer optical thin film is formed by ion sputtering, the temperature elevation of the aluminum layer is especially great, so that the effect of the first invention is particularly large.

The third invention that is used to achieve the object described above is the first invention or second invention, wherein the multilayer optical thin film consists of alternately laminated niobium pentoxide thin films and silicon oxide thin films, and the substance in the film formed directly above the soluble is silicon oxide.

In cases where an optical thin film is formed by laminating niobium pentoxide thin films and silicon oxide thin films, if a film of niobium pentoxide is formed on aluminum, the elevation of temperature causes the niobium pentoxide and aluminum to react, so that aluminum oxide is formed. Since aluminum oxide is not dissolved by a substance that dissolves aluminum, the peeling characteristics of the substrate and multilayer optical thin film deteriorate. In contrast, if a film of silicon oxide is formed directly above aluminum, such a problem can be prevented.

The fourth invention that is used to achieve the object described above is a multilayer film optical element in which layers having different refractive indices are alternately formed, and the substrate is removed during manufacture, wherein the surface roughness of the optical surfaces of the multilayer film optical element is 3 nm or less in terms of Ra.

With the present invention, a filter without a substrate which is such that Ra is 3 nm or less can be acquired for the first time, so that a filter that has extremely low loss with respect to transmitted light can be provided.

DETAILED DESCRIPTION OF THE INVENTION

Figure 1:
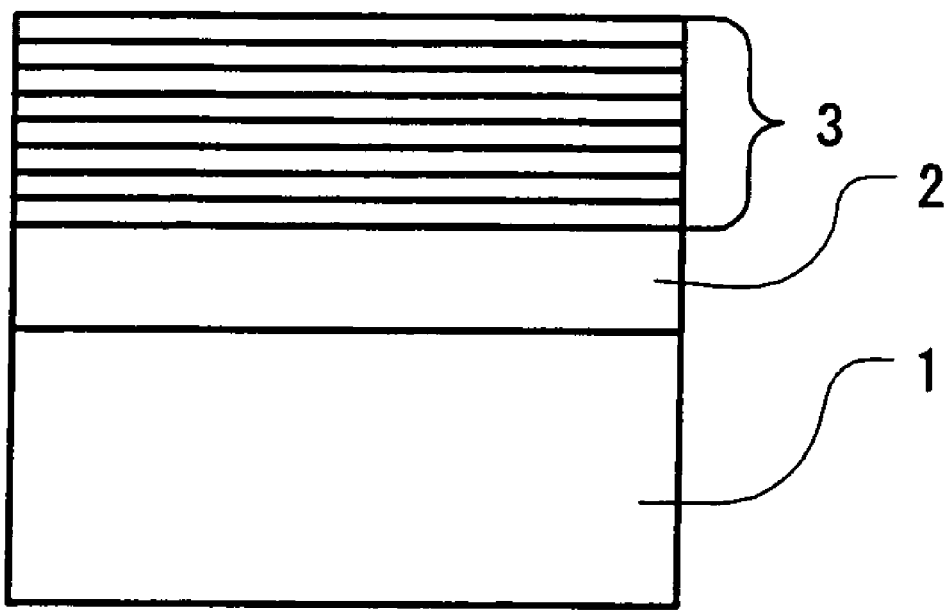
FIG. 1 is a diagram that is used to illustrate a method for manufacturing a multilayer optical thin film in an embodiment of the present invention.
Figure 1:
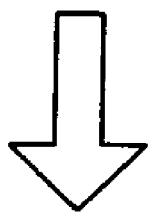
Figure 1:
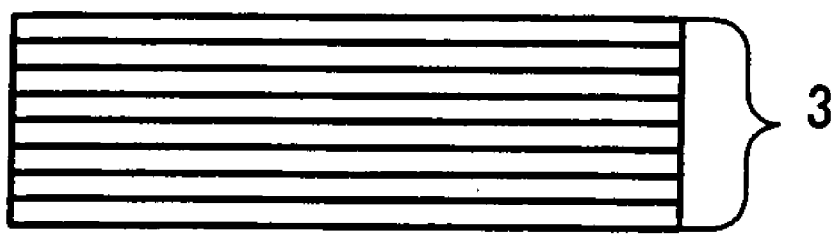
Figure 1:
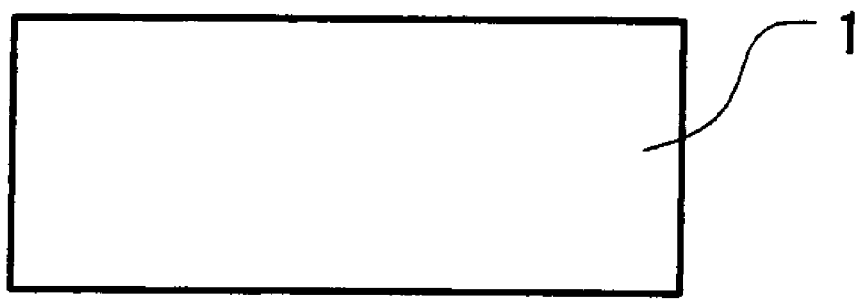

As is shown in FIG. 1, a film of aluminum 2 was formed on a glass substrate (BK7) 1 by means of vacuum evaporation, and a multilayer optical thin film 3 consisting of a structure shown in Table 1 and having a total film thickness of approximately 30 μm was formed by an ion sputtering method on this aluminum film 2 (the description of the 7th layer to the 107th layer is omitted since the odd-number layers are the same as the fifth layer and the even-number layers are the same as the sixth layer). Afterwards, such a member was cut into small pieces by means of dicing, and the aluminum 2 was then etched by an NaOH solution, so that the glass substrate 1 and the multilayer optical thin film 3 were separated. A substrate in a mirror surface state was used as the glass substrate 1, and the surface roughness was 0.2 to 0.4 nm in terms of Ra.

TABLE 1

| Layer No. | Substance | Refractive index | Film thickness (nm) |
|---|---|---|---|
| 1 | SiO$_2$ | 1.46 | 265 |
| 2 | Nb$_2$O$_5$ | 2.23 | 336 |
| 3 | SiO$_2$ | 1.46 | 215 |
| 4 | Nb$_2$O$_5$ | 2.23 | 135 |
| 5 | SiO$_2$ | 1.46 | 215 |
| 6 | Nb$_2$O$_5$ | 2.23 | 123 |
| ... | ... | ... | ... |
| ... | ... | ... | ... |
| ... | ... | ... | ... |
| 108 | Nb$_2$O$_5$ | 2.23 | 170 |
| 109 | SiO$_2$ | 1.46 | 253 |
| 110 | Nb$_2$O$_5$ | 2.23 | 174 |
| 111 | SiO$_2$ | 1.46 | 265 |

Table 2 shows the relationship between the occurrence of clouding in the multilayer optical thin film 3 obtained, the peeling characteristics of the multilayer optical thin film 3 and substrate 1, and the thickness of the aluminum.

TABLE 2

| Al thickness | Clouding | Peeling characteristics |
|---|---|---|
| 5 nm | Absent | Impossible |
| 10 nm | Absent | Good |
| 90 nm | Absent | Good |
| 100 nm | Present | Good |

It is seen from the results in Table 2 that if the aluminum thickness is 10 to 90 nm, no clouding occurs in the multilayer optical thin film, and the separation characteristics of the multilayer optical thin film and substrate are good. Furthermore, the surface roughness on the aluminum side of the multilayer optical thin film was 0.4 nm in terms of Ra when the aluminum thickness was 90 nm, and was 1 nm in terms of Ra when the aluminum thickness was 100 nm. Moreover, the etching time was 40 hours when the aluminum thickness was 10 nm, but when the aluminum thickness was 5 nm, complete peeling was not possible.

Next, the roughness of the multilayer optical thin film formed on the aluminum layer with a surface roughness Ra of 0.4 nm was measured. As a result of this measurement, it was found that the surface roughness of the frontmost layer on the side opposite from the side of the aluminum layer was 3 nm. In general, in the film formed by a vacuum evaporation method, the surface roughness of the film increases as the total film thickness increases.

However, in the multilayer optical thin film in the embodiment of the present invention, not only is clouding not confirmed by visual observation, but a surface roughness comparable to that of a conventional filter having a substrate can also be achieved even on the surface whose roughness is thought to be the highest.

Incidentally, both the surface on the side of the aluminum layer and the surface of the frontmost layer on the side opposite from the side of the aluminum layer become optical surfaces through which light beams pass. By achieving an extremely small degree of roughness on the optical surfaces, the effect of lowering loss that is required in filters used for optical communications is further expanded. Furthermore, the surface roughness Ra in this embodiment is obtained by measuring a 10 μm×10 μm region by means of an atomic force microscope.

Thus, since the surface roughness of a filter with no substrate is 3 nm or less in terms of Ra within a 100 μm$^2$ range, a filter with no substrate having little loss with respect to the transmitted light can be obtained.

Next, multilayer optical thin films were formed using a method similar to the method described above, but without forming the first layer film shown in Table 1, so that an Nb$_2$O$_5$ thin film was formed on the aluminum, with the aluminum thickness being set at 10 nm and 90 nm, respectively.

As a result, in either case, etching by means of an NaOH solution did not work well, and the peeling characteristics of the substrate and multilayer optical thin film were poor, so that it was impossible to obtain a multilayer optical thin film that can withstand practical use.

What is claimed is:

1. A method for manufacturing a multilayer film optical element comprising forming a thin film consisting essentially of aluminum having a thickness of 10 to 90 nm on a substrate, forming a multilayer optical thin film on said thin film consisting essentially of aluminum, and subsequently dissolving said thin film consisting essentially of aluminum so that the substrate and the multilayer optical thin film are separated.

2. The method for manufacturing a multilayer film optical element according to claim 1, wherein said multilayer optical thin film consists essentially of a plurality of alternate layers of niobium pentoxide thin films and silicon oxide thin films, and a silicon oxide thin film is positioned directly on said thin film consisting essentially of aluminum.

3. The method for manufacturing a multilayer film optical element according to claim 1, wherein said multilayer optical thin film consists essentially of a plurality of alternate layers of niobium pentoxide thin films and silicon oxide thin films, and a silicon oxide thin film is positioned directly on said thin film consisting essentially of aluminum.

* * * * *

UNITED STATES PATENT AND TRADEMARK OFFICE
CERTIFICATE OF CORRECTION

PATENT NO. : 7,544,392 B2
APPLICATION NO. : 11/606517
DATED : June 9, 2009
INVENTOR(S) : Kunihiko Yoshino Page 1 of 1

It is certified that error appears in the above-identified patent and that said Letters Patent is hereby corrected as shown below:

Title Page, Column 1, under "Related U.S. Application Data," Item (60), line 3, replace "Jun. 14," with --Jun. 17,--.

Signed and Sealed this

Twenty-seventh Day of October, 2009

David J. Kappos
*Director of the United States Patent and Trademark Office*